United States Patent
Olander

(10) Patent No.: US 7,284,564 B2
(45) Date of Patent: Oct. 23, 2007

(54) GAS STORAGE AND DISPENSING SYSTEM FOR VARIABLE CONDUCTANCE DISPENSING OF GAS AT CONSTANT FLOW RATE

(75) Inventor: W. Karl Olander, Indian Shores, FL (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 11/311,199

(22) Filed: Dec. 19, 2005

(65) Prior Publication Data

US 2006/0090797 A1    May 4, 2006

Related U.S. Application Data

(62) Division of application No. 10/321,757, filed on Dec. 17, 2002, now Pat. No. 6,997,202.

(51) Int. Cl.
*G05D 7/06* (2006.01)
(52) U.S. Cl. .............. 137/14; 137/486; 137/487.5; 137/590; 222/3; 700/283
(58) Field of Classification Search ............. 137/14, 137/486, 487.5, 590; 222/3; 62/48.1
See application file for complete search history.

(56) References Cited

U.S. PATENT DOCUMENTS

| 3,963,043 | A | 6/1976 | Cota et al. |
|---|---|---|---|
| 3,999,572 | A | 12/1976 | Mohr |
| 4,030,525 | A | 6/1977 | Cram et al. |
| 5,329,965 | A | 7/1994 | Gordon |
| 5,505,092 | A | 4/1996 | Kowalski |
| 5,518,528 | A | 5/1996 | Tom et al. |
| 5,875,817 | A | 3/1999 | Carter |
| 5,937,895 | A | 8/1999 | Le Febre et al. |
| 6,007,609 | A | 12/1999 | Semerdjian et al. |
| 6,012,474 | A * | 1/2000 | Takamoto et al. ............ 137/14 |
| 6,101,816 | A * | 8/2000 | Wang et al. ................. 62/48.1 |
| 6,257,000 | B1 | 7/2001 | Wang |
| 6,453,924 | B1 | 9/2002 | Wang et al. |
| 6,476,046 | B1 * | 11/2002 | Gabrel .................. 137/505.42 |

* cited by examiner

*Primary Examiner*—Ramesh Krishnamurthy
(74) *Attorney, Agent, or Firm*—Steven J. Hultquist; Intellectual Property/Technology Law; Maggie Chappuis

(57) ABSTRACT

A gas supply system arranged for dispensing of gas at a predetermined flow rate. The system employs a gas dispensing flow circuitry arranged for dispensing gas at selectively variable gas flow conductance conditions, to maintain the flow rate of the dispensed gas at a predetermined, e.g., constant, value in the operation of the system. The gas dispensing flow circuitry may include an array of dispensed gas flow passages, each of a differing conductance, or alternatively a variable conductance gas flow passage equipped with a variable conductance assembly for modulating the gas flow conductance of the passage, in response to sensed pressure of the gas or other system parameter. The system permits the flow rate of a dispensed gas to be maintained at a consistent desired level, despite the progressive decline in source gas pressure as the gas source vessel is depleted in use.

12 Claims, 6 Drawing Sheets

GAS STORAGE AND DISPENSING SYSTEM FOR VARIABLE CONDUCTANCE DISPENSING OF GAS AT CONSTANT FLOW RATE

CROSS REFERENCE TO RELATED APPLICATIONS

This is a division of U.S. patent application Ser. No. 10/321,757 filed Dec. 17, 2002 now U.S. Pat. No. 6,997,202 in the name of W. Karl Olander for "GAS STORAGE AND DISPENSING SYSTEM FOR VARIABLE CONDUCTANCE DISPENSING OF GAS AT CONSTANT FLOW RATE." Priority of said U.S. patent application Ser. No. 10/321,757 is hereby claimed under 35 USC 120. The disclosure of said U.S. patent application Ser. No. 10/321,757 is hereby incorporated herein by reference in its entirety, for all purposes.

FIELD OF THE INVENTION

The present invention relates to a gas storage and dispensing system arranged for variable conductance dispensing of gas at predetermined, e.g., constant flow rate.

DESCRIPTION OF THE RELATED ART

In the use of gas storage and dispensing systems for compressed high-pressure gases, the risk of using compressed gases is nominally proportional to the pressure of the stored gas inventory. Gas cylinders are typically filled to pressures ranging from a few hundred psig to >1500 psig. The force acting to discharge the stored contents is larger as the pressure increases and hence the risk is elevated.

In calculating the risk factors associated with the use of compressed gases by Fault Tree Analysis, minimizing the consequence term for an event is critical. If the conditions for a gas release should occur, it is fundamentally important that the gas storage and dispensing system design minimize the release rate, particularly where the gas is of a toxic or otherwise hazardous character.

A common practice in current use of high-pressure gas cylinders is to employ a restrictive flow orifice (RFO) inserted into the throat of the cylinder, downstream of the cylinder valve. A small orifice—typically about 0.010" in diameter—creates a pressure drop and limits the gas flow that can be discharged from the cylinder. The RFO diameter thereby effectively limits and determines the maximum discharge rate (as a worst case gas release event) for any gas and pressure combination.

For example, in the case of a conventional compressed gas cylinder holding silane gas at 800 psig, an RFO having a diameter of 0.010" limits the gas discharge rate to nominally 1 standard cubic foot of gas per minute (scfm) (=30 standard liters per minute (slpm)). Without this RFO, the maximum discharge rate could be 20 times higher, with potentially catastrophic results (due to the toxicity and pyrophoric character of silane).

As a result of the foregoing considerations, it has become standard practice for compressed gas cylinders to have RFOs in instances when the contained gases are hazardous in character.

Such RFOs, however, have the fundamental deficiency that they inhibit gas flow as the pressure of the remaining gas in the compressed gas cylinder decreases with continued dispensing of gas from the cylinder. The diameter of the RFO is selected as a compromise between limiting the magnitude and/or consequences of an incidental gas release and being able to withdraw the contents of compressed gas from the high-pressure gas cylinder at a suitable rate for the intended use of the gas (taking into account the pressure drop associated with gas flow through the orifice). For example, the RFO diameter may be selected to provide a maximum discharge rate that is a predetermined multiple of the average use rate of gas that is dispensed from the compressed gas cylinder.

In many semiconductor manufacturing operations, the maximum compressed gas cylinder discharge rate is 3-10× times the gas usage rate required by the manufacturing process. By way of illustration, silane gas from a compressed gas cylinder may be used in a semiconductor manufacturing facility at an average rate of 1-6 slpm, with a worst case release rate of silane gas from the cylinder of 30 slpm. Given the hazardous nature of silane and many other gases used in semiconductor processing, matching the maximum discharge rate to the use requirement, by choice of an appropriate diameter RFO, is a safe and effective practice.

However, considering the illustrative compressed silane gas cylinder in further detail, as cylinder pressures are increased, the worst case release rates (utilizing a 0.010" orifice diameter RFO) successively change to 2.50 scfm, 1.97 scfm and 1.51 scfm as the internal gas pressure varies from 1500 psig to 1200 psig to 1000 psig, respectively. The large worst case release rates associated with high pressures thus disincentivizes the use of larger fill densities and higher pressures.

When maximum instantaneous use rates of gas dispensed from the compressed gas cylinder are high (e.g., in a 4-6 slpm range), flow cannot be sustained through an RFO at high cylinder pressures (e.g., pressures on the order of 125-175 psig, for the aforementioned use rates of silane), and the cylinders under such conditions appear empty. This inability of the RFO-equipped compressed gas cylinder to provide flow of gas at desired use rates when the gas inventory of the cylinder has declined, results in residual gas in the cylinder being unavailable to the end use process at the desired process pressure, and remaining unused in the cylinder. This residual gas (termed a "heel") in many instances may be more than ten percent of the original gas inventory of the cylinder. Such levels of heels are costly, since the gas user typically is charged for the full gas fill of the cylinder, even though the residuum is unable to be dispensed from the cylinder, and the gas company to whom the vessel is subsequently returned for reclamation will remove the residual gas from the vessel and destroy it. The residual gas thereby is wasted, and at the same time, additional time, effort and expense are involved in removing the significant residual gas volumes from the used cylinder.

In sum, while the use of RFO devices in conjunction with high pressure gas cylinders has provided a marked enhancement in operational safety of such gas supply systems, this safety enhancement also entails the associated deficiencies of increased heels of residual gas in the compressed gas cylinder, and inability to maintain flow rate and pressure at desired operational set point values when the amount of gas in the compressed gas cylinder declines to a low inventory level.

It would therefore be a significant advance in the art to provide a compressed gas storage and dispensing system that overcomes the aforementioned deficiencies of the prior art, and enables continuous dispensing of gas from a compressed gas cylinder at desired set point values of flow rate, even when the cylinder gas inventory is at low levels.

SUMMARY OF THE INVENTION

The present invention relates generally to a gas storage and dispensing system arranged for flow control of the dispensed gas at predetermined, e.g., constant, flow rate, and to an associated method of dispensing gas, e.g., for applications such as semiconductor manufacturing operations.

In one aspect, the invention relates to a gas supply system arranged for dispensing of gas at predetermined flow rate, comprising a gas source vessel and gas dispensing flow circuitry coupled to said vessel, wherein the gas dispensing flow circuitry is arranged for dispensing gas at selectively variable gas flow conductance conditions, to maintain said predetermined flow rate of the dispensed gas in the operation of the system.

In another aspect, the invention relates to a method of dispensing gas at predetermined flow rate from a gas source vessel, comprising dispensing said gas under selectively variable gas flow conductance conditions, wherein gas flow conductance is selectively varied during dispensing to maintain said predetermined, e.g., constant, flow rate of the dispensed gas in the operation of the system.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
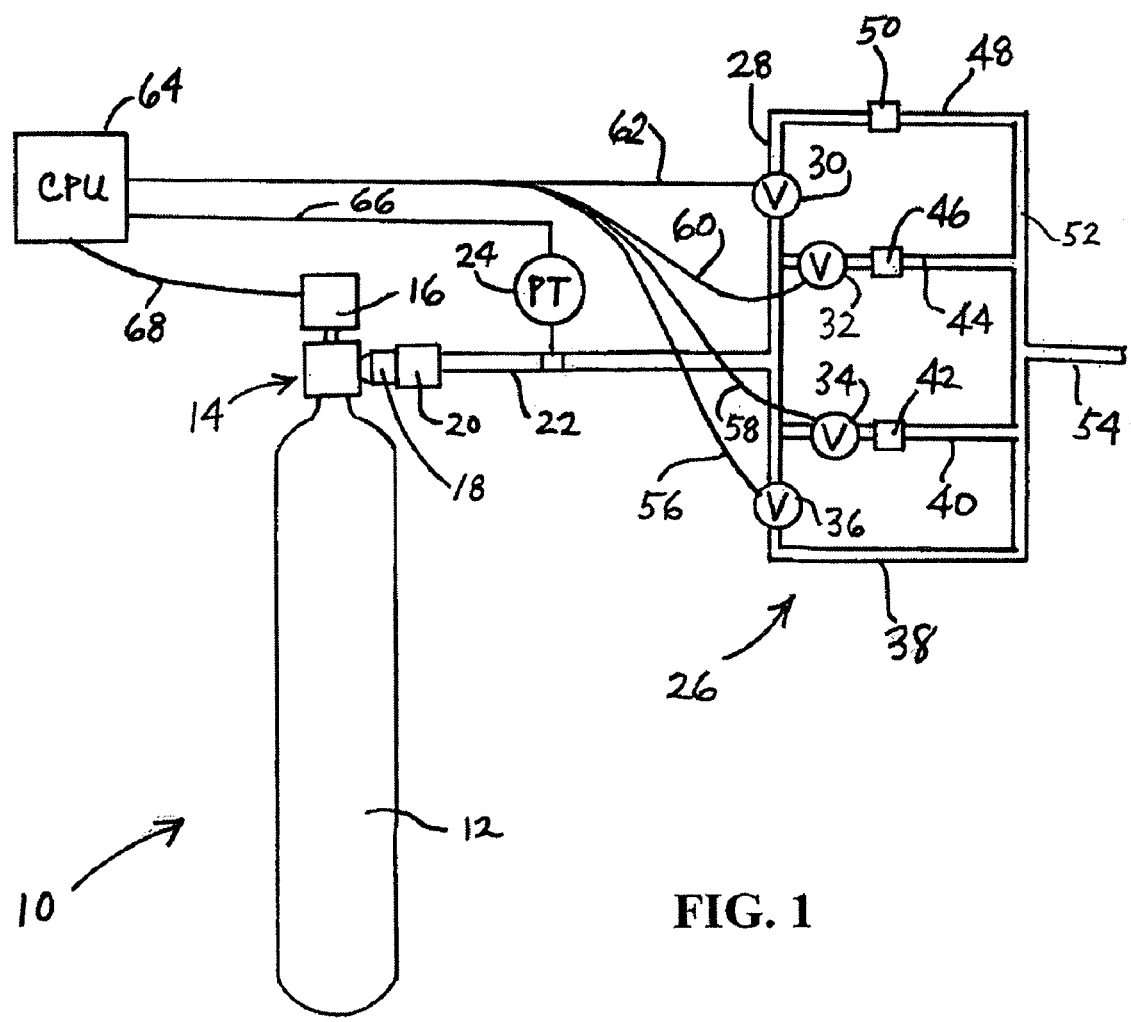
FIG. 1 is a schematic representation of a gas supply system according to one embodiment of the present invention.

The present invention is based on the discovery that the deficiencies of the prior art may be efficiently overcome by the use of variable-size orifice devices, which are selectively adjustable to vary the flow conductance of the orifice, and thereby modulate the flow of gas from a compressed gas vessel in a manner achieving desired flow rate of dispensed gas, even when the cylinder is in a low gas inventory state where the prior art RFO-equipped cylinders have been unable to function.

The invention therefore substantially reduces the heels of gas inventory when the compressed gas cylinder is "depleted," i.e., unable to further deliver gas at the desired set point flow rate, after ongoing use of the vessel to supply such gas at set point flow rate levels.

The variable size orifice device in the practice of the present invention may be of any suitable form and type, which provides the ability to selectively vary the size of a gas flow passage through which the compressed gas dispensed from the gas supply vessel is flowed during the dispensing operation. The size of the gas flow passage is preferably selectively adjustable in a plane transverse (generally perpendicular to) the flow direction of the dispensed gas.

The invention may be varied widely in structure and operation, as will be more fully apparent from the ensuing disclosure. For example, the variable size flow passage may include an adjustable size orifice element, disposed in a gas conduit joined to the gas supply vessel, so that the transverse dimension of the lumen presented to the dispensed gas is adjusted in correspondence to the pressure level of the dispensed gas.

The size-adjusting means for the flow passage may be widely varied in the broad practice of the invention, and may for example include, without limitation: (i) a shutter aperture assembly in which blades or vanes are selectively translated relative to one another to vary the size of the aperture opening; (ii) flow circuitry including an array of flow passages, each having a different gas flow conductance, e.g., an array of flow passages, all except one of which contains a restricted flow orifice of a fixed and different diameter and one of which contains no restriction therein, with the array of flow passages being arranged for selective flow of dispensed gas from the gas supply vessel through one of such array of flow passages whose flow conductance yields a predetermined flow rate; (iii) an expandable occlusive element, arranged to expand responsively to the pressure of the dispensed gas so as to correspondingly partially occlude a passage through which the dispensed gas is flowed, to an extent proportional to pressure of the dispensed gas; (iv) an extensible occlusive element, arranged to extend responsively to the pressure of the dispensed gas so as to correspondingly partially occlude a passage through which the dispensed gas is flowed, to an extent proportional to pressure of the dispensed gas; and (v) a displaceable occlusive element, arranged to extend responsively to the pressure of the dispensed gas so as to correspondingly partially occlude a passage through which the dispensed gas is flowed, to an extent proportional to pressure of the dispensed gas.

An illustrative variable flow orifice device useful in the practice of the present invention is the Pneutronics VSO voltage sensitive orifice proportional solenoid valve, commercially available from Pneutronics Division of Parker Hannifin Corporation, Hollis, N.H. The Pneutronics VSO valve is a miniature solenoid operated proportional valve that controls gas flow in proportion to input current to the valve. Such a valve can therefore be deployed in a flow line, e.g., of a gas dispensing assembly or a manifold joined to the gas supply vessel, and actuated with an actuating signal generated by a pressure transducer measuring relevant pressure of the dispensed gas.

The pressure sensor (transducer) can for such purpose be arranged in the valve head of the gas cylinder from which gas is selectively dispensed, or in the flow circuitry upstream of the variable orifice proportional solenoid valve when the valve is deployed in a downstream portion of the flow circuitry. Alternatively, the pressure sensor or pressure monitor can be mounted inside the gas storage and dispensing vessel, and generate a control signal that is transmitted to the variable orifice proportional solenoid valve, to vary the orifice opening dimension and thereby responsively modulate the valve to maintain a predetermined, e.g., constant, flow rate of gas from the gas supply system.

In this manner, the flow conductance of the variable orifice element is modulated in a manner correlative to the change in pressure with continued dispensing of gas from the gas supply system. For such purpose, the pressure sensor can be a pressure transducer that generates a current signal or other suitable actuating signal that is indicative of or correlative to the dispensed gas pressure detected by the sensor, and is transmitted to the variable orifice valve. The variable orifice proportional valve can for example be driven by a DC current from the pressure transducer, or by pulse width modulation (PWM), and may be variable in orifice diameter as necessary or desirable in a given application. For example, the variable orifice valve can be arranged to provide an orifice opening of a diameter in a range of from about 0.010 inch (0.254 mm) to about 0.065 inch (1.651 mm), with the gas flow rate settable to a value in a range of from about 0.05 standard liters per minute to about 40 standard liters per minute.

In one embodiment, the variable orifice proportional valve is arranged in a pressure controller circuit containing a comparator circuit coupled with the variable orifice proportional valve and with a pressure transducer monitoring the pressure of the dispensed gas from the gas supply vessel. The pressure transducer is monitored by the comparator circuit and communicates to the variable orifice proportional valve the sensed variation in the pressure, so that the valve is opened or closed to an extent necessary to maintain the gas flow rate constant or otherwise at a predetermined value.

In another embodiment, a gas storage and dispensing vessel may be provided in which a pressure transducer and the variable conductance flow controlling orifice element, such as the aforementioned variable orifice proportional valve, can both be disposed interiorly in the gas storage and dispensing vessel, to modulate the orifice opening dimension as the gas is progressively depleted during dispensing thereof from the vessel, i.e., so that the vessel is self-actuating to dispense a constant flow rate of gas regardless of the gas inventory or pressure level in the interior volume of the vessel.

By way of specific example, if the flow rate of gas flowed from a gas supply vessel initially at 400 psig interior pressure to a semiconductor manufacturing tool is desired to be maintained at ~0.5 standard cubic feet per minute (SCFM), then the orifice opening dimension can be varied with interior vessel gas pressure to maintain a substantially constant dispensed gas flow rate, as shown in Table 1 below.

TABLE 1

Orifice Diameter and Vessel Pressure for Gas Flow of ~0.5 SCFM

| Gas Vessel Pressure, psig | Variable Orifice Device Opening Dimension, inches | Actual Dispensed Gas Flow Rate, SCFM |
|---|---|---|
| 400 | 0.010 | 0.480 |
| 200 | 0.014 | 0.465 |
| 100 | 0.020 | 0.497 |

Table 1 shows that each of the pressure/orifice dimension combinations achieves very close to the same dispensed gas flow rate, even though the pressure of the contained gas in the vessel declines by a factor of 4, because the area of the orifice opening is corresponding changed (a 0.020 inch orifice diameter yields an opening area of 0.000314 square inches; a 0.014 inch orifice diameter yields an opening area of 0.000153 square inches; and a 0.010 inch orifice diameter yields an opening area of 0.000078 square inches).

Thus, the open area of the orifice varies by a factor of 4 in the illustrative example above, and the pressure correspondingly changes by a factor of 4 to achieve the same volumetric flow rate of gas across the orifice flow restriction.

The invention thus provides a constant flow gas supply vessel using a variable aperture/conductance device. The discharge pressure will necessarily vary with continued dispensing of gas from the gas supply vessel, as the pressure of the gas in the vessel decays over time. In order to maintain the gas pressure at a desired constant value as received by the gas-consuming unit or locus that is coupled in gas flow communication with the gas supply vessel, and at the same time maintain the dispensed gas flow rate constant by means of the variable orifice arrangement of the invention, a regulator can be employed in the downstream flow circuitry from the gas supply vessel, to compensate for declining gas supply pressure by using the regulator to adjust the supply pressure of the dispensed gas to a constant value.

The regulator can be suitably positioned in the flow circuitry in any appropriate manner. For example, when the gas supply vessel is contained in a gas cabinet equipped with flow circuitry at least partially mounted to a gas panel in the cabinet, the regulator can be mounted on the gas panel, as a component of the flow circuitry. As a further modification, a mass flow controller can be provided at the downstream gas-consuming tool or locus, to control the absolute delivery amount and rate of gas feed to such tool or locus.

Although the preceding discussion has been directed to illustrative arrangements in which a pressure is monitored or sensed to produce a signal indicative of the pressure of the dispensed gas that can be used to directly modulate the orifice element, it will be appreciated that other arrangements may be employed in which the variable orifice element may be selectively modulated to maintain a predetermined gas flow rate.

Thus, in a broader aspect, the present invention contemplates the variable conductance orifice device being of any suitable type and operative character, and being actuated for modulation of the orifice dimension in any manner that is effective to produce a predetermined flow rate of gas from a gas storage and dispensing vessel. For example, the variable orifice element may be actuated in response to a cycle time controller, or by a control signal generated by a general-purpose computer that is programmably arranged to vary the dimension of the variable orifice element according to a predetermined gas flow rate-dispensing schedule. Such schedule can for example be fixed in any suitable manner, e.g., based on the size and gas fill level of the gas supply vessel and/or parameters (e.g., temperature, pressure, flow rate, gas consumption rate, etc.) relating to the operation of a downstream gas-consuming unit or locus joined in gas flow communication with the gas supply vessel via the interposed gas flow circuitry.

As another operating modality, an indirect measure of interior volume gas pressure in the gas supply vessel may be employed for purposes of generating a correlative signal for actuating and modulating the variable orifice element, to achieve a predetermined gas flow rate dispensing profile, e.g., a constant flow supply of gas throughout the dispensing operation. As an illustrative example of the use of such an indirect gas pressure-indicative characteristic for modulating the variable orifice element, a strain gauge can be coupled to the wall of the gas supply vessel and arranged to generate an output correlative to the sensed strain of the vessel wall. By this arrangement, the vessel wall strain indirectly reflects the pressure of the gas contained in the vessel, and the corresponding output reflecting the strain level, or alternatively the rate of change of the sensed strain, can be used to modulate the variable orifice element to achieve the desired constant flow rate of dispensed gas.

The invention also contemplates the use of multiple concurrent or alternative inputs to modulate the variable orifice element. For example, two external inputs could be employed to adjust the setting of the aforementioned VSO valve, or other variable orifice element.

One such input could be generated by a strain gauge on the wall of the fluid storage and dispensing vessel, as discussed above, with the pressure-related output used to drive the orifice diameter adjustment. The use of strain gauges for generating output indicative of interior pressure of a fluid storage and dispensing vessel is more fully described in copending U.S. patent application Ser. No. 09/783,919 filed Feb. 15, 2001 in the name of James V. McManus, et al. for "Fluid Storage and Dispensing System Featuring Ex Situ Strain Gauge Pressure Monitoring System," the disclosure of which hereby is incorporated herein by reference in its entirety.

Another input for the adjustment of the orifice diameter can be based on the weight of the vessel as measured during gas dispensing and used to generate a corresponding control signal that is correlative with interior pressure of the gas in the fluid storage and dispensing vessel. For example, the vessel containing gas to be dispensed can be disposed on a scale, with the weight reading correlating with pressure in the vessel and generating a signal that is used as an input to the aforementioned VSO valve, or other variable orifice element.

As a further variation, multiple concurrent pressure-related sensing inputs can be provided to a comparator circuit and a net signal generated to compensate for disparities between respective pressure-related sensing inputs, or a computational module could otherwise be employed to average or algorithmically manipulate data generated by multiple sensings or different sensing modalities, to provide modulation of the variable orifice element in the gas dispensing system so that constant flow rate is maintained throughout the gas dispensing operation.

It will therefore be appreciated that the variable orifice (variable conductance) gas dispensing arrangement of the invention can be implemented in any of numerous ways to provide a constant or otherwise predetermined flow rate of gas from a gas supply vessel throughout the dispensing operation, so that the gas heel is minimized when the vessel is taken out of service for recharging or other disposition.

In a simple arrangement, the invention can be implemented with a variable diameter aperture in the gas flow path of a cylinder under pressure, with the aperture diameter being responsively adjustable to the pressure level of the gas being dispensed from the compressed gas cylinder. For example, if a desired flow rate of 2 slpm were needed, the initial opening dimension of the variable-diameter aperture would be relatively small and the desired 2 slpm delivery rate of gas would be maintained, from the initial high gas pressure condition of the contained gas in the cylinder to the ultimate low pressure condition, by responsively varying the diameter of the selectively adjustable diameter aperture, so that it is increased as the pressure decays during gas discharge. At the ultimate low pressure condition of the contained gas in the cylinder, the aperture would be opened to a widest dimension, to facilitate the dispensing operation at the desired flow rate despite the diminution in level of the cylinder pressure.

In operation, the variable-size aperture may be continuously adjusted, e.g., by automatic pressure monitoring and pressure-responsive aperture adjustment means, or the aperture sizing adjustment may be effected in a stepwise fashion, depending on the cumulative period of operation of the gas cylinder, or on a sequential run basis, as desired in a specific end-use application of the invention. By means of the adjustment of the transverse size of the flow passage of the dispensed gas, the gas flow conductance of the flow passage is selectively modulated to maintain the desired set point pressure and flow rate operating conditions.

In order to actuate the variable flow conductance means employed in the practice of the invention, the pressure of the dispensed gas may be monitored and a correlative control signal generated for modulating the variable flow conductance means to achieve a predetermined flow rate of the dispensed gas at the sensed dispensing pressure. Any suitable pressure sensing means may be employed, as for example: (i) a pressure transducer; (ii) a manometric sensor coupled with optoelectronic means for generating a signal indicative of the manometrically sensed pressure; (iii) a pressure-responsive translational element, such as a flow stream impingement surface that is deflectionally translated to an extent determined by the magnitude of the pressure of the stream impinging on it; (iv) a pressure-responsive colorimetric element whose spectral character is dependent on the magnitude of the dispensing gas pressure; (v) a physisorbing medium disposed on a surface acoustic wave (SAW) device, in which the physisorbing medium has a sorptive affinity for the dispensed gas, arranged so that the extent of the physical adsorption of the gas on the physisorbing medium is a calibrated function of pressure of the dispensing gas; etc.

The pressure of the dispensing gas may be sensed at a point immediately upstream of the variable flow conductance means, or the pressure may be sensed at the gas supply vessel, e.g., by a pressure transducer disposed in a flow passage of the valve head of a compressed gas cylinder, or the pressure of the dispensed gas may be sensed at any other suitable location, and in any suitable manner.

In one embodiment, the variable flow conductance means include an adjustable aperture element disposed in a flow conduit joined to the gas supply vessel, and automatically or manually adjustable to provide a selected flow conductance in the conduit for maintenance of the flow rate of the dispensed gas at a constant or predetermined level during the dispense operation, even as the inventory of gas from the gas supply vessel is being depleted.

The aperture element could be arranged so that the adjustable opening otherwise obtainable by the aperture element is completely closed during shipment and storage of the gas supply system, and also during installation of the gas supply system, whereby the closed aperture element effectively performs an added safety feature against leaks across the valve seat of the gas supply system.

Thereafter, during cycle purging (with inert or other purge gas) of the flow circuitry associated with the gas supply vessel in the gas supply system, prior to opening of the flow control valve on the compressed gas cylinder, or prior to other inception of active dispensing operation, the aperture would be opened to its maximum extent, while keeping the flow control valve on the compressed gas cylinder closed, to allow the shortest pump down cycles and most efficient exchanges with the purge gas.

The adjustable aperture element could also be used to advantage during the compressed gas cylinder filling process, by opening the aperture element to its maximum extent to allow rapid filling through flow circuitry associated with the gas supply vessel, of the vessel. Alternatively, a dedicated fill port could be used on the gas containment vessel, to initially charge the vessel with compressed gas.

As the gas in the adjustable aperture-equipped gas supply system becomes depleted and its pressure drops, the aperture is successively opened to allow the maximum withdrawal of the gas contents of the gas supply vessel. The gas dispensing operation preferably is carried out with adjustment of the variable aperture so that at least 90% dispensing of the gas from the gas supply vessel is achieved (i.e., so that the heels at the ultimate conclusion of use of the gas supply system is less than 10%), more preferably so that at least 95% dispensing of the gas from the gas supply vessel is achieved, and most preferably so that at least 98% dispensing of the gas from the gas supply vessel is achieved.

Referring now to the drawings, FIG. 1 is a schematic representation of a gas supply system 10 according to one embodiment of the present invention.

The gas supply system 10 includes a gas storage and dispensing vessel in the form of compressed gas cylinder 12. At its upper neck region, the cylinder 12 is joined to a valve head assembly 14 including a valve head block containing interior flow passages for dispensing of the compressed gas, and an interior gas flow control valve element, which is joined in turn to valve actuator 16. The valve actuator 16 is arranged via signal transmission line 68 coupled with the central processing unit (CPU) 64, to be selectively actuated to open or close the flow control valve in the valve head block, as desired.

The valve head block is coupled with a discharge coupling member 18, which in turn is matably engageable with connector 20 joined to the gas discharge line 22. In this embodiment, a pressure transducer (PT) 24 is arranged for sensing of the pressure of the dispensed gas flowing in gas discharge line 22. The sensed pressure is employed to generate a correlative pressure signal, which is transmitted in signal transmission line 66 to the CPU 66.

The gas discharge line 22 is coupled to the gas flow manifold 26 as shown. Manifold 26 includes a manifold inlet line 28 and a manifold outlet line 52. Interconnecting manifold inlet line 28 and manifold outlet line 52 are branch flow lines 38, 40, 44 and 48. Branch flow line 38 has no flow occlusion element therein, i.e., it is a straight run of conduit. By contrast, branch lines 40, 44 and 48 contain restricted flow orifice (RFO) elements 42, 46 and 50, respectively, therein. Each of such RFO elements 42, 46 and 50 has a different orifice diameter, and hence a different flow conductance.

The manifold outlet line 52 is joined to gas discharge line 54, which in turn is coupled with a downstream gas-consumption facility, e.g., a semiconductor manufacturing tool in a semiconductor manufacturing plant (not shown).

The manifold 26 is equipped with flow control valves 30, 32, 34 and 36, as shown. Each of these valves is selectively openable or closeable by the CPU 64, which functions as a controller module for the gas supply system 10, and is linked to valves 30, 32, 34 and 36 via signal transmission lines 62, 60, 58 and 56, respectively. By this arrangement, dispensed gas from the compressed gas cylinder 12 flowing in gas discharge line 22 is selectively flowable into the manifold inlet line 28 and then into one of the four interconnecting branch lines 28, 42, 44 and 48, depending on which of the valves 30, 32, 34 and 36 is open. For example, valves 32, 34 and 36 may be closed and valve 30 open, whereby dispensed gas may be flowed in branch line 48 through RFO 50, having the lowest flow conductance of all the branch lines of the manifold. Gas then flows at a rate corresponding to the initial highest pressure level in the gas supply vessel 12 through branch line 8 of the manifold and into manifold outlet line 52 and then into gas discharge line 54, for delivery to the downstream gas-consuming unit or process.

Thereafter, when the pressure of the gas in the gas supply vessel 12 declines to a lower value, valve 30 is closed, and valve 32 is opened, with all other manifold valves remaining closed. Gas then is flowed through the branch line 44 having RFO 46 therein. RFO 46 has the next-higher flow conductance, in relation to lowest conductance RFO 50, and gas therefore is flowed at a rate through branch line 44 that maintains the level flowed through branch line 48 in the initial stages of operation.

Subsequently, as pressure in the gas supply vessel falls still further, as sensed in the dispensed gas pressure by pressure transducer 24, which transmits a corresponding signal in transmission line 66 to the CPU 64, valve 32 is closed, and valve 34 is opened. Gas then flows through branch line 40 having RFO 42 therein, which has a next-higher flow conductance in relation to RFO element 46, and flows into the manifold outlet line 52 and gas discharge line 54. As gas pressure in the supply vessel 12 declines further with continued dispensing, as sensed by pressure transducer 24 and relayed to CPU 64 by a signal in signal transmission line 66, the CPU functions to close valve 34 and to open valve 36, all other manifold valves remaining closed. Gas the flows from the manifold inlet line 28 through line 38 having no RFO element therein, and thereby the highest gas flow conductance of all the manifold branch lines, and then into manifold outlet line 52 and gas discharge line 54 for the final phase of gas dispensing operation until the gas supply vessel is exhausted of gas to a final extent of depletion.

The gas supply system 10 shown in FIG. 1 thus may be operated with continuous monitoring of pressure in gas dispensing line 22 by the pressure transducer 24, by means of a pressure monitoring signal transmitted from the pressure transducer 24 to the CPU 64, subsequent to initial actuation by the CPU of the dispensing valve actuator 16, by corresponding initiation signal in signal transmission line 68.

Thereafter, the CPU 64 sends successive valve opening signals to each of the manifold valves 30, 32, 34 and 36 in turn as the pressure sensed by the transducer 24 declines in the continuing dispensing operation to the pressure set point levels at which next successive valve opening changeover occurs to flow the dispensed gas in a correspondingly higher conductance branch line of the manifold 26. In this manner, the flow rate and pressure of the dispensed gas are maintained substantially constant throughout the entire period of dispensing operation of the gas supply system 10. The CPU may therefore be programmably arranged so that the pressure reduction differential triggering the valve switching is consistently low enough so that the overall pressure drop during the dispensing operation is minimized, e.g., less than 30 torr overall pressure drop.

Figure 2:
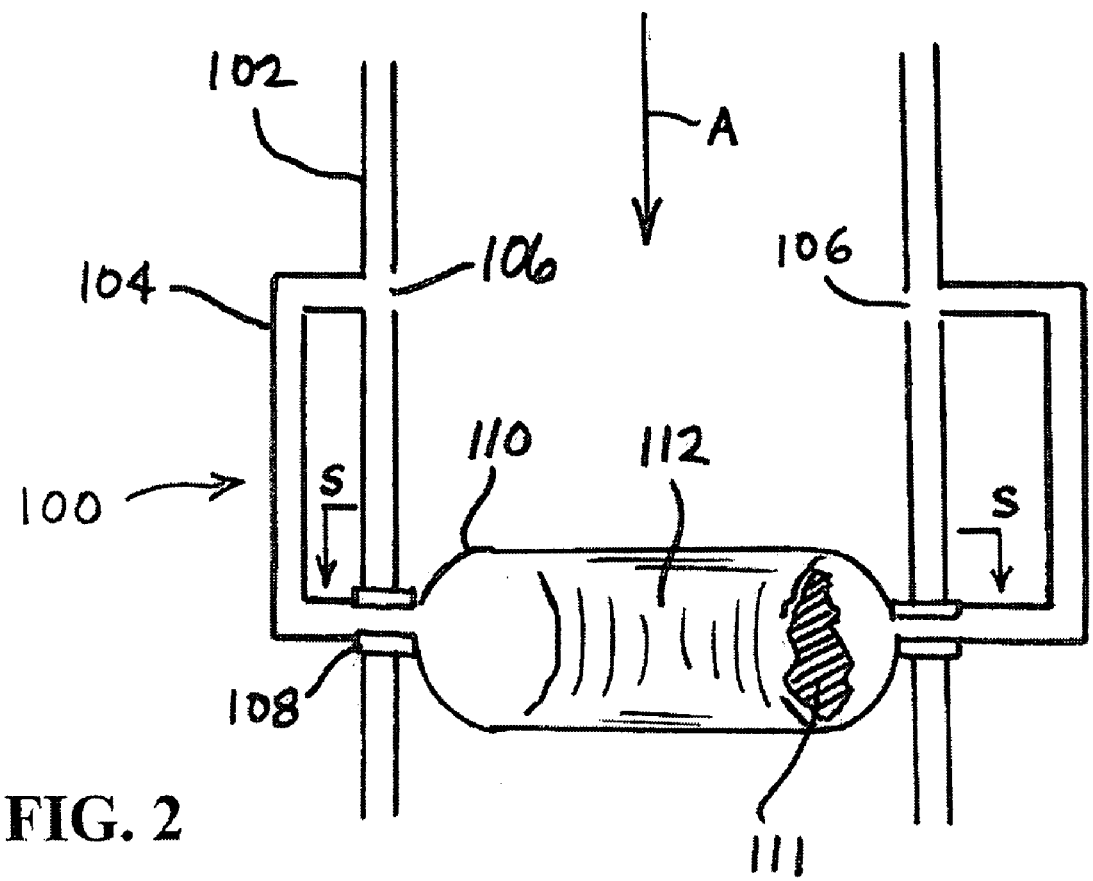
FIG. 2 is a schematic representation of a variable flow conductance aperture assembly according to another embodiment of the invention.

FIG. 2 is a schematic representation of a variable size flow aperture assembly 100 according to another embodiment of the invention. The aperture assembly is associated with a gas dispensing conduit 102 through which the dispensed gas from the gas supply system, e.g., a gas supply vessel of the type shown in FIG. 1, is flowed during the gas dispensing operation.

The gas dispensing conduit 102 is equipped with an expandable toroidal bladder 110 defining a central flow opening 112 therewithin. The bladder 110 has an interior gas-receiving volume 111 that communicates with gas feed tube 104 having an open upstream end 106 (upstream with reference to the downstream bladder 110) in gas flow communication with the interior gas flow passage of the conduit 102, and joined at its opposite downstream end with the bladder. The tube 104 extends through the wall of the conduit 102 at its downstream end, extending interiorly for coupling with the bladder, through ferrule 108, as shown.

By the arrangement shown in FIG. 2, the central opening 112 within the doughnut-shaped ring of the bladder 110 is minimized during initial operation of the gas supply system, as the pressure of the flowing gas expands the interior volume 111 of the bladder 110 to provide a relatively small opening and relatively lower gas flow conductance.

Subsequently, as the pressure decreases, the lower gas pressure communicated through the tube 104 inflates the interior volume 111 of the bladder 110 to a correspondingly lower extent, resulting in a diminished expansion of the bladder and correspondingly greater open area of the central opening 112. Thus, the gas flow conductance of the bladder-circumscribed variable size opening 112 increases with decreasing pressure.

Figure 3:
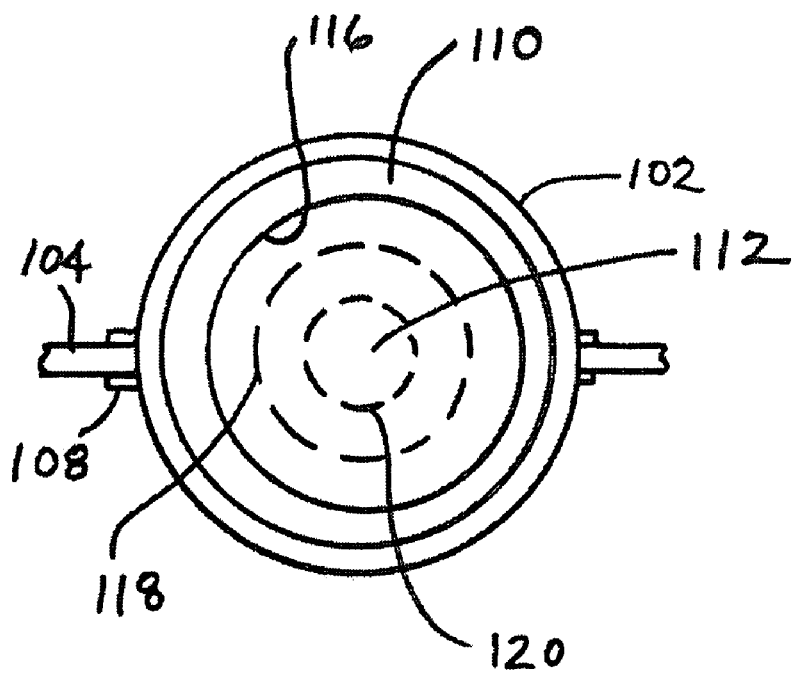
FIG. 3 is a schematic representation of a top plan view of the variable conductance flow aperture assembly of FIG. 2.

FIG. 3 is a schematic representation of a top plan view of the variable size flow aperture assembly 100 of FIG. 2, taken along line S-S thereof, wherein all elements are numbered correspondingly with respect to the same elements in FIG. 1. The inner periphery 116 of the bladder 110 thus in the plan view illustrated demarcates a circle bounding the flow passage opening 112. The position of such inner periphery illustrates a low dispensing gas pressure at a final phase of gas dispensing operation. At an initial phase of gas dispensing operation, when the gas supply vessel is at a maximum pressure, the inner periphery of the bladder 110 demarcates the circle depicted by dashed line 120. At a subsequent intermediate phase of gas dispensing operation, the intermediate pressure causes the inner periphery of the bladder 110 to demarcate the circle depicted by dashed line 118.

Figure 4:
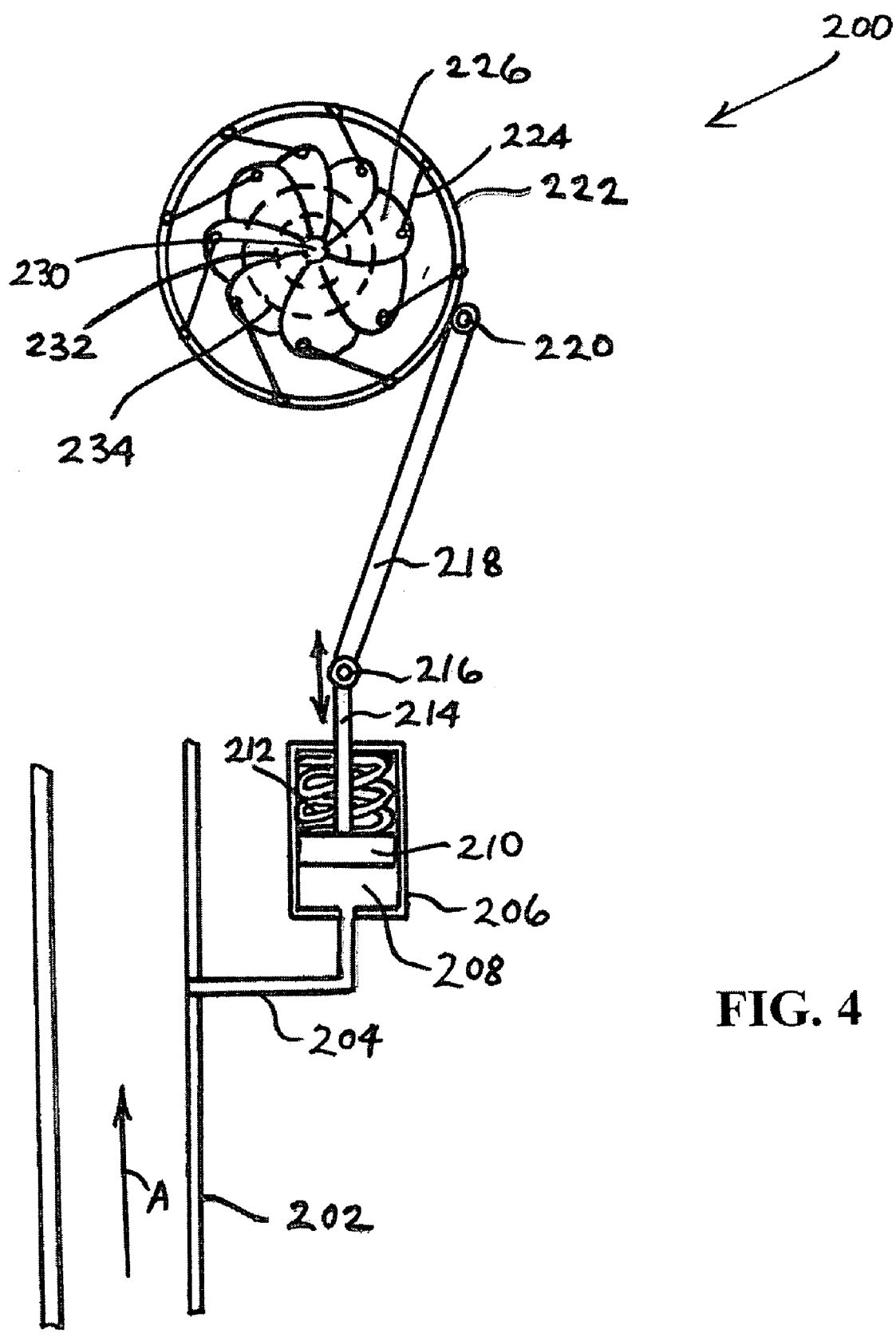
FIG. 4 is a schematic representation of a variable size flow aperture assembly according to yet another embodiment of the invention.

FIG. 4 is a schematic representation of a variable size flow aperture assembly 200 according to yet another embodiment of the invention.

In the FIG. 4 embodiment, a variable size aperture assembly 200 includes an array of shutter vanes 226 arranged as illustrated to define a central aperture 230 in the view shown. Each of the vanes 226 is joined at its outer periphery by linkage arm 224 to an outer rotatable ring 222, so that successive rotation of the rotatable ring 222 causes the central aperture 220 to widen in diameter, e.g., to positions including a further opened aperture indicated by dashed line 232 and a still further opened aperture indicated by dashed line 234.

The shutter array of vanes is disposed in a downstream portion of a gas dispensing conduit 202, through which dispensed gas is flowed in the direction indicated by arrow A. On the rotatable ring 222 is provided a pivot pin 220 to which a control arm 218 is joined at one end. The control arm 218 is joined at its opposite end to pivot pin 216, which is also connected to the push rod 214 affixed to piston 210.

The piston 210 is mounted for reciprocal movement in the interior volume 208 of cylinder 206, with the spring 212 serving to bias the piston 210 toward the end of the cylinder having gas feed tube 204 joined thereto in gas flow communication with the interior volume 208.

The gas feed tube 204 is connected at an opposite end to the gas dispensing conduit 202, so that gas flows from the interior passage of the gas dispensing conduit into the tube 204 and then into the interior volume 208 of the cylinder 206.

At initial gas dispensing higher pressure conditions, the gas pressure is higher than the biasing force of the spring 212, and the piston 210 is translated toward the back wall of the cylinder, thereby compressing the spring and causing the push rod 214 to translate the control arm 218 so that the rotatable ring 220 is rotated in a counter-clockwise direction in the view shown, to cause the shutter aperture to be relatively smaller, with lower gas flow conductance.

Subsequently, as the dispensing gas pressure declines, the lower pressure exerted on the piston 210 causes the rotatable ring 220 to be rotated progressively in a clockwise direction, thereby opening the aperture (to the successive opening 232 in an intermediate phase of gas dispensing operation, and thereafter to a subsequent opening 234 in a final phase of gas dispensing operation). In this manner, the gas flow conductance of the aperture is successively increased to maintain the dispensed gas flow rate substantially constant.

Figure 5:
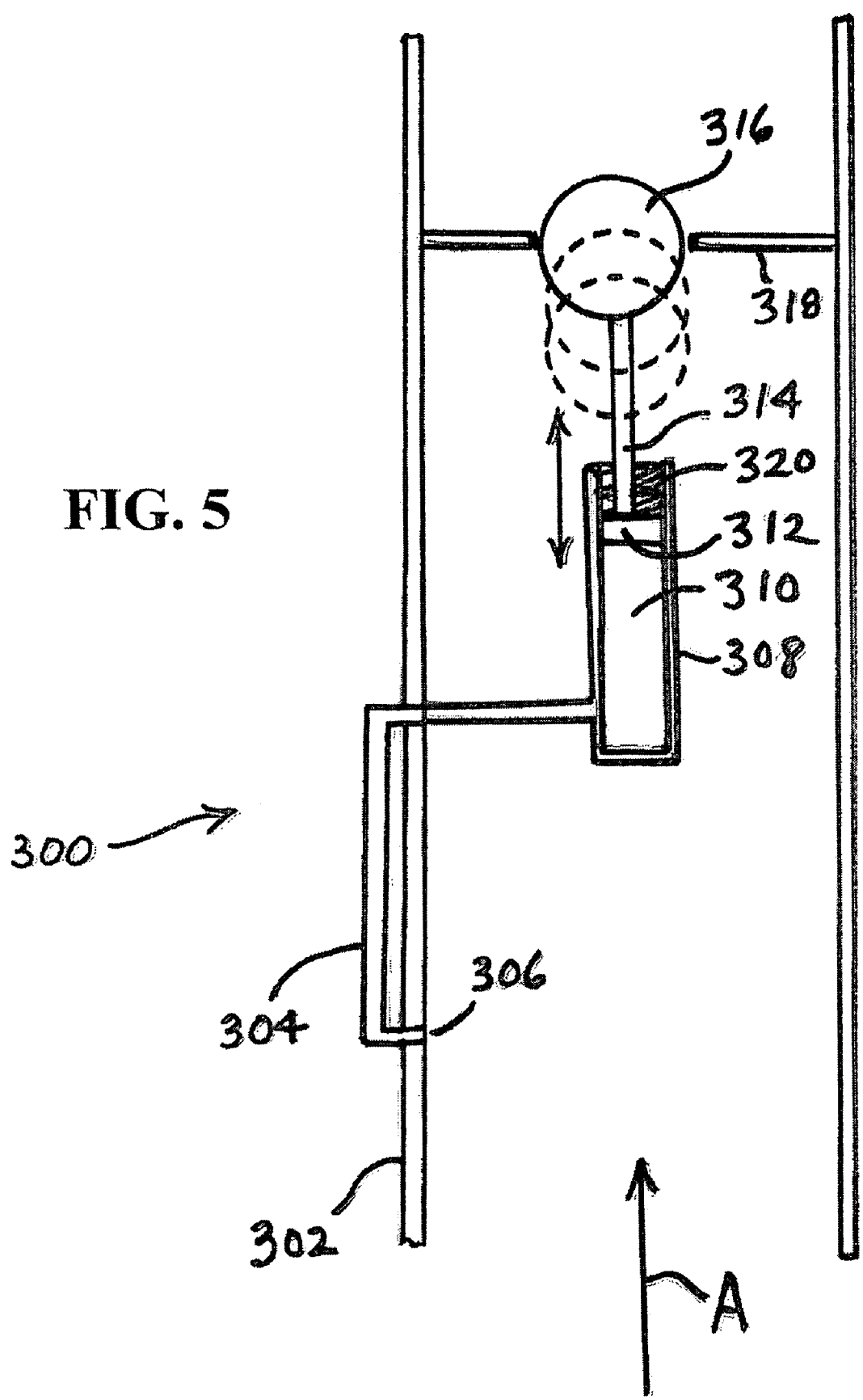
FIG. 5 is a schematic representation of a variable size flow aperture assembly according to yet another embodiment of the invention.

FIG. 5 is a schematic representation of a variable size flow aperture assembly 300 according to yet another embodiment of the invention.

In this embodiment, dispensed gas is flowed through a gas dispensing conduit 302 in a direction indicated by arrow A. A fixed-size opening annular ring 318 is disposed in a downstream portion of the conduit, as illustrated.

The fixed-size opening of the annular ring 318 is engaged by a poppet ball element 316 joined to a connecting rod 314 that is affixed at an opposite end to piston 312. The piston 312 is mounted in a centrally disposed cylinder 308 in the interior passage of the conduit 302.

The cylinder encloses with the piston 312 an interior cylinder volume 310 that communicates with an upstream portion of the conduit 302 by means of a gas feed tube 304 having a first end 306 open to admit the gas from the upstream portion of the conduit 302, so that the pressure of the upstream dispensed gas is communicated through the gas feed tube 304 to the cylinder interior volume 310 and translates the poppet ball element 316 to a nearly closed position, as illustrated.

Subsequently, as the dispensed gas pressure declines in the course of the dispensing operation, the reducing gas pressure communicated from the upstream portion of the dispensing gas conduit 302 is manifested by a rearward retraction of the poppet ball element 316 under the influence of the biasing spring 320, so that the flow conductance of the opening defined by the annular ring 318 is correspondingly increased with the progressive retraction of the piston 312 and interconnected poppet ball element 316.

Figure 6:
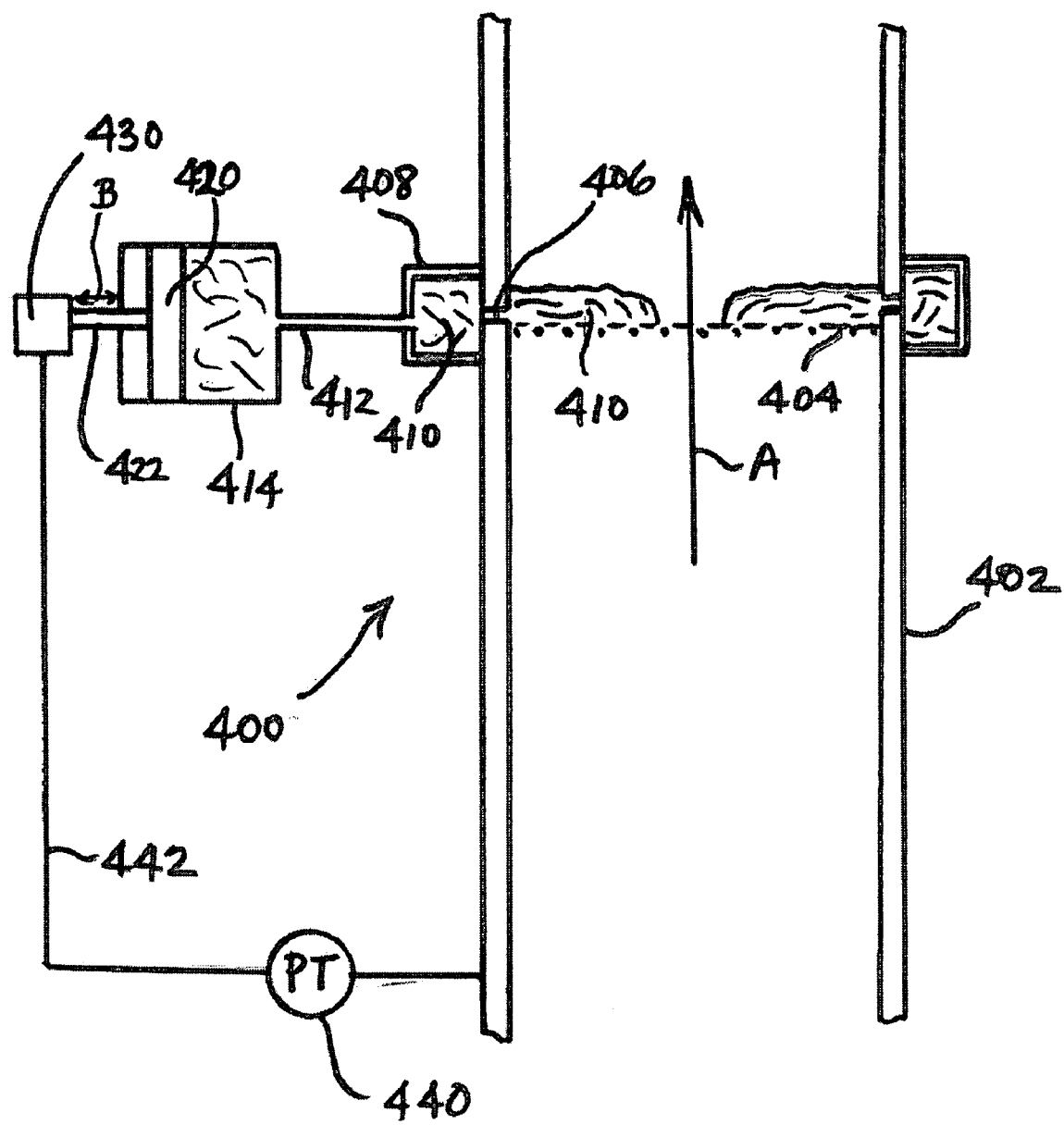
FIG. 6 is a schematic representation of a variable size flow aperture assembly according to still another embodiment of the invention.

FIG. 6 is a schematic representation of a variable size flow aperture assembly 400 according to still another embodiment of the invention.

In this embodiment, dispensed gas is flowed through a gas dispensing conduit 402 in a direction indicated by arrow A. A screen element 404 is disposed in a downstream portion of the conduit, as illustrated. The screen element 404 is a foraminous support for a memory material 410, such as an elastomeric flowable solid, which is exuded onto the screen element 404 from the circumscribing annular reservoir 408 through wall openings 406, in response to the upstream pressure in conduit 402 sensed by pressure transducer 440. The circumscribing annular reservoir 408 is coupled by solid flow conduit 412 to a cylinder 414 containing a source mass of the memory material 410.

The pressure transducer 440 is arranged to communicate with the upstream portion of the conduit 402, by a pressure tap line, and to responsively transmit a pressure-indicating signal in signal transmission line 442 to the actuator module 430. The actuator module 430 may comprise suitable microprocessor or other programmable assembly and an associated electromechanical driver that is responsive to the pressure-indicating signal, to effect translational movement (in either of the opposing directions indicated by bi-directional arrow B) of the piston rod 422 joined to piston 420.

The piston 420 is disposed in cylinder 414 containing the source mass of the memory material 410. In response to increasing upstream pressure, the actuator module 430 causes the rightward translation (in the system as illustrated in FIG. 6) of the piston 420, causing the flow of the memory material 410 from the source mass in cylinder 414 through the solid flow conduit 412 to the circumscribing annular reservoir 408 from which the memory material flows through openings 406 spaced at regular intervals about the circumference of the wall of the conduit 402, and flows onto the screen to contract the central opening bounded by the screen-supported memory material.

Conversely, under decreasing pressure conditions sensed by the pressure transducer 440 in the upstream portion of the conduit 402, a correlative pressure-indicating signal transmitted in signal transmission line 442 to the actuator module 430 causes the retraction of the piston 420 in the cylinder 414, so that the memory material on the screen element 404 correspondingly withdraws through holes 406 in the wall of conduit 402, and increases the size of the central opening bounded by the screen-supported memory material, proportional to the decrease in pressure.

In this manner, the conductance of the variable aperture is modulated in proportion to the pressure sensed by the pressure transducer 440, so that the gas flow conductance is lower at initial high-pressure gas dispensing conditions and higher at subsequent reduced pressure gas dispensing conditions, so as to maintain the dispensed gas flow rate substantially constant, throughout the gas dispensing operation.

Figure 7:
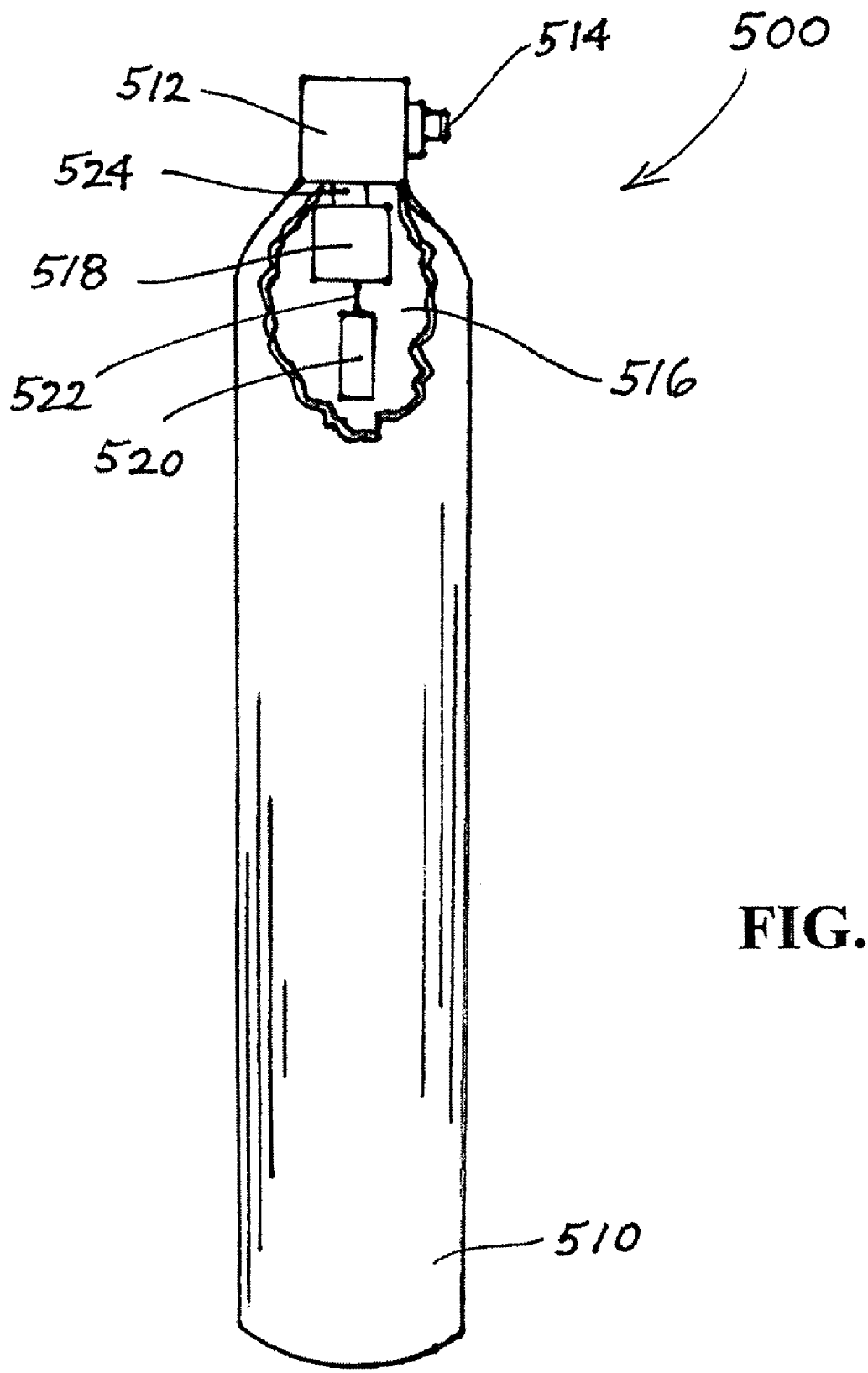
FIG. 7 is a front elevation view of a gas storage and dispensing system according to another embodiment of the invention, as partially broken away to show the details of the interior components of the gas storage and dispensing vessel.

FIG. 7 is a front elevation view of a gas storage and dispensing system 500 according to another embodiment of the invention, as partially broken away to show the details of the interior components of the gas storage and dispensing vessel 510.

The gas storage and dispensing vessel 510 as shown is of vertically upstanding cylindrical shape, having a wall enclosing the interior volume 516. The vessel 510 has an upper neck region that is leak-tightly joined to the head assembly 512. The head assembly 512 includes a gas discharge coupling 514 at a face of the head assembly, arranged for coupling the head assembly of the vessel with a gas dispensing line to a downstream gas-consuming unit or locus, e.g., a semiconductor manufacturing tool.

In the interior volume 516 of the vessel 510 is disposed a pressure sensing device 520 arranged for sensing the gas pressure in the interior volume and generating a corresponding output indicative of the pressure level. The pressure sensing device 520 is coupled with variable orifice device 518 via the interconnecting signal transmission line 522. The output signal from the pressure sensing device 520 is transmitted by the signal transmission line 522 to the variable orifice device 518, to modulate the size (open area) of the gas flow opening bounded by the variable orifice therein.

The modulation of the gas flow opening size is correlative to the pressure level in the interior volume that is sensed by the pressure sensing device 520, so that the orifice size changes during gas dispensing, as pressure in the interior volume declines, to maintain a substantially constant gas flow rate.

The gas flow modulated by the variable orifice device 518 flows from such device through discharge passage 524 coupled to the head assembly 512, and is discharged at the outlet port defined by the coupling 514. Head assembly for such purpose has an interior dispensing passage for flow of dispensed gas therethrough. The head assembly in such arrangement can be equipped with a manual or automatic valve to open or shut the interior dispensing passage, as in a conventional valve head structure.

Alternatively, the coupling 514 can be joined to a suitable valve or other gas flow control element, for opening the head assembly to gas dispensing. As another modification of the illustrated structure, the variable orifice device can also be arranged so that it functions with the orifice totally closed to gas flow during periods other than active dispensing operation, and is only open when the head assembly is coupled with a gas dispensing line, such as by a mechanical interlock mechanism that is actuated to free the orifice device for adjustment of the gas flow conductance. The mechanical interlock mechanism can be arranged so that there is a button, slide, lever or other manually or automatically element on the head assembly that is manipulated to unlock the orifice adjustment structure.

One advantage of the gas storage and dispensing system arrangement shown in FIG. 7 is that the pressure sensing device and orifice adjustment device are interiorly mounted in the interior volume of the vessel. As a result, these components are protected from the exterior environment of the vessel, and are protected by the vessel casing from impact, contamination, etc.

In operation, the variable orifice device of the FIG. 7 system is driven by the signal from the pressure sensing device, to vary the orifice opening of the variable orifice device, and maintain a substantially constant flow rate of dispensed gas from the gas storage and dispensing system.

The gas storage and dispensing vessel 510 in the FIG. 7 system can be arranged with the interior volume 516 holding only compressed gas for selective dispensing, or the interior volume can hold a physical sorbent medium having sorptive affinity for the gas. In the latter arrangement, gas is stored on the physical sorbent medium in the interior volume, being reversibly adsorbed thereon, and desorbable therefrom under dispensing desorption conditions. The desorption conditions can include a pressure differential effecting desorption of the gas to the dispensing flow circuitry, or selective heating of the physical adsorbent in the vessel so that it releases the gas via desorption, or by flow of a carrier gas through the sorbent in the interior volume to effect a concentration gradient that mediates the desorption of the gas from the sorbent material.

The physical sorbent for such purpose can comprise any suitable sorbent material having sorptive affinity for the gas to be stored in and subsequently dispensed from the gas storage and dispensing vessel. Sorbent-based gas storage and dispensing systems of such type are more fully described in U.S. Pat. No. 5,518,528 to Glenn M. Tom, et al., the disclosure of which is hereby incorporated herein in its entirety.

The gas contained in the gas storage and dispensing vessel of FIG. 7 can be any suitable type, e.g., a gas useful in semiconductor manufacturing, such as hydride gases, halide gases, organometallic source reagent gases, etc. The gas contained in the vessel can be at any suitable pressure, e.g., superatmospheric, atmospheric or subatmospheric. For example, atmospheric or subatmospheric gas storage and dispensing systems of the invention can be utilized for doping or ion implantation applications in the manufacture of semiconductor products.

It will be appreciated that the invention can be variously embodied to employ fluid pressure amplification, such as by means of an electro-pneumatically-based piezoelectric gas pressure amplifier device, to generate a pressure-related dispensed gas pressure-indicating signal for control purposes, so that extremely small variations in dispensed gas pressure may be compensated by the associated variable gas flow passage conductance-modulating componentry, to maintain the dispensed gas flow rate substantially constant.

It will also be apparent that the gas flow conductance of the dispensed gas flow circuitry may be modulated or selectively altered in a wide variety of ways, of which the foregoing embodiments are merely illustrative.

Thus, while the invention has been described herein in reference to specific aspects, features and illustrative embodiments of the invention, it will be appreciated that the utility of the invention is not thus limited, but rather extends to and encompasses numerous other aspects, features and embodiments, as will suggest themselves to those of ordinary skill in the art, based on the disclosure herein. Accordingly, the claims hereafter set forth are intended to be correspondingly broadly construed, as including all such aspects, features and embodiments, within their spirit and scope.

What is claimed is:

1. A gas supply system arranged for dispensing of gas at predetermined flow rate, comprising a gas source vessel and gas dispensing flow circuitry coupled to said vessel, wherein the gas dispensing flow circuitry comprises a variable size orifice device arranged for dispensing gas at variable gas flow conductance conditions during gas dispensing operation involving change in amount and pressure of gas in said gas source vessel, to maintain said predetermined flow rate of the dispensed gas in the operation of the system, wherein the gas dispensing flow circuitry is at least partially disposed in an interior volume of the gas source vessel, with the variable size orifice device being disposed in said interior volume, and a pressure sensing device disposed in said interior volume, arranged to sense pressure of the gas in said interior volume, and coupled in controlling relationship with the variable size orifice device to vary open area of its orifice in response to the sensed pressure of the gas in said interior volume.

2. The gas supply system of claim 1, wherein the gas dispensing flow circuitry comprises at least one pressure sensing device arranged to produce output(s) indicative of pressure of gas in said gas source vessel and coupled in controlling relationship to the variable size orifice device to vary open area of its orifice in response to said output(s).

3. The gas supply system of claim 2, wherein the at least one pressure sensing device comprises device(s) selected from the group consisting of:
strain gauges coupled to the gas source vessel;
pressure transducer sensors;
fluid pressure amplifiers;
gas source vessel weight monitoring assemblies;
manometric sensors coupled with an optoelectronic converter for generating a signal indicative of the manometrically sensed pressure;
pressure-responsive translational elements that arc deflectionally translated to an extent determined by the magnitude of the pressure of gas impinged thereon;
pressure-responsive colorimetric elements whose spectral character is dependent on the magnitude of pressure of the dispensed gas; and
physisorbing media disposed on a surface acoustic wave (SAW) device, in which the physisorbing medium has a sorptive affinity for the dispensed gas, arranged so that the extent of the physical adsorption of the gas on the physisorbing medium is a calibrated function of pressure of the dispensed gas.

4. The gas supply system of claim 1, further comprising a gas dispensing controller coupled in controlling relationship to the adjustable size orifice element to adjust the size of its orifice.

5. The gas supply system of claim 4, wherein the gas dispensing controller comprises a general purpose computer programmatically arranged for controlling the adjustable size orifice element.

6. The gas supply system of claim 1, wherein the gas source vessel contains a semiconductor manufacturing gas.

7. The gas supply system of claim 1, wherein the gas dispensing flow circuitry is coupled to a semiconductor manufacturing tool and said gas source vessel contains a semiconductor manufacturing gas but does not contain an interiorly disposed regulator.

8. The gas supply system of claim 1, wherein the gas dispensing flow circuitry comprises a regulator arranged exteriorly of the gas source vessel to compensate for declining gas supply pressure during gas dispensing by adjusting the supply pressure of the dispensed gas to a predetermined value, and wherein the gas source vessel does not contain an interiorly disposed regulator.

9. The gas supply system of claim 1, wherein the gas dispensing flow circuitry is coupled to a downstream gas-consuming tool or locus, and a mass flow controller is provided at the downstream gas-consuming tool or locus, to control the amount and rate of gas flowed to said tool or locus.

10. The gas supply system of claim 1, wherein the gas source vessel contains a physical adsorbent having sorptive affinity for the gas but does not contain an interiorly disposed regulator.

11. A gas supply system arranged for dispensing of gas at predetermined flow rate, comprising a gas source vessel and gas dispensing flow circuitry coupled to said vessel, wherein the gas dispensing flow circuitry comprises a variable size orifice device arranged for dispensing gas at variable gas flow conductance conditions during gas dispensing operation involving change in amount and pressure of gas in said gas source vessel, to maintain said predetermined flow rate of the dispensed gas in the operation of the system, wherein the variable size orifice device comprises a voltage sensitive orifice proportional solenoid valve that is coupled with a pressure sensing device adapted to sense pressure of gas in said gas source vessel and to responsively modulate the variable size orifice device.

12. A method of dispensing gas at constant pressure and flow rate from a gas source vessel, comprising dispensing said gas under selectively variable gas flow conductance conditions through a variable size orifice device, wherein gas flow conductance is selectively varied during dispensing to maintain a predetermined flow rate of the dispensed gas in the operation of the system involving change in amount and pressure of gas in said gas source vessel, and flowing the dispensed gas after passage through said variable size orifice device through a regulator to compensate for declining gas supply pressure in said gas source vessel and adjust pressure of the dispensed gas to a constant value, further comprising sensing pressure of gas in said gas source vessel, and wherein said gas flow conductance is selectively varied by adjustment of the variable size orifice device during dispensing in response to said sensed pressure.

* * * * *

UNITED STATES PATENT AND TRADEMARK OFFICE
CERTIFICATE OF CORRECTION

PATENT NO. : 7,284,564 B2
APPLICATION NO. : 11/311199
DATED : October 23, 2007
INVENTOR(S) : W. Karl Olander Page 1 of 1

It is certified that error appears in the above-identified patent and that said Letters Patent is hereby corrected as shown below:

Title Page, Item (56), References Cited, U.S. Patent Documents, second column, second entry, "4,030,525" should be -- 4,030,523 --.

Title Page, Item (56), References Cited, U.S. Patent Documents, second column, thirteenth entry, "6,476,046" should be -- 6,478,046 --.

Signed and Sealed this

Fourth Day of March, 2008

JON W. DUDAS
*Director of the United States Patent and Trademark Office*